Inventor
Werner HEINL
By Spencer & Kaye
Attorneys

United States Patent Office 3,606,353
Patented Sept. 20, 1971

3,606,353
SEALING RING
Werner Heinl, Burscheid, Germany, assignor to Goetzewerke Friedrich Goetze A.G., Burscheid, Germany
Filed Apr. 3, 1969, Ser. No. 813,126
Claims priority, application Germany, Apr. 4, 1968,
P 17 50 169.8
Int. Cl. F16j *15/32*
U.S. Cl. 277—134         6 Claims

ABSTRACT OF THE DISCLOSURE

A shaft sealing ring includes an annular connecting portion, an annular sleeve portion joined to the connecting portion, and an annular sealing portion joined to the sleeve portion and having an annular sealing edge. A plurality of circumferentially distributed elastic tongues extend radially from the sealing portion. Each tongue has a portion which extends beyond the maximum radial dimension of the sealing edge. As a result the tongues engage with tension a shaft surface. The tongues are axially spaced from the sealing edge and the region of each tongue which is closest to the sealing edge extends radially the furthest beyond the maximum radial dimension of the sealing edge.

BACKGROUND OF THE INVENTION

(1) Field of the invention

This invention relates to a shaft sealing ring and more particularly to a ring for sealing a liquid-containing space from an air space.

(2) Description of the prior art

One known type of shaft sealing ring has a smooth shaft bearing surface which separates a liquid-containing space from an air-containing space. This type of ring has also been made with grooves or ribs which extend radially from the bearing surface toward the shaft axis. These may also be helically oriented. The medium to be sealed, usually a liquid, may return to the liquid space through these grooves. If the ribs or grooves are located on the side of the sealing surface which is closest to the air space, an air current flows between the sealing surface and the shaft. This air current opposes flow of liquid from its space. On the other hand, if the ribs or grooves are arranged on that part of the sealing surface which faces the liquid side, the liquid is repelled directly.

Shaft sealing rings have also been used whose sealing surfaces have helical ribs or grooves on both the air and on the liquid side. Some difficulty has been experienced with this type of seal, because there was not enough cross-sectional area for the desired flow. This was particularly true when a high spring pressure was exerted on the sealing surface in order to provide a good static seal; that is, when the shaft it at rest. A further drawback of such helical sealing arrangements is that the effectiveness of the seal depends upon the rotational direction of the shaft.

Consequently, an improved shaft sealing ring has been developed which utilizes thin-walled tongues formed on that face of the sealing surface which is the closest to the liquid side. These tongues extend radially inwardly and originate at an annular edge separating a sealing surface which faces towards the liquid side from a sealing surface which faces towards the air side. These tongues extend along almost the entire axial width of the portion of the sealing surface which is on the liquid side of the edge. The inner diameter of the tongues is slightly less than the diameter of the shaft to be sealed. As a result, these tongues, which are elastic, bend over like vanes during the shaft rotation due to the friction caused by their overlapping the shaft surface.

Thereby, it is their constant aim to keep liquid away from the sealing edge, but they are not assisted therein by a current of air between the sealing edge and the shaft, because the tongues are arranged on the liquid-side.

SUMMARY OF THE INVENTION

Among the objects of the present invention is the provision of a shaft sealing ring which provides a good seal without regard to the direction in which the shaft rotates.

A further object of the invention is the provision of a shaft seal in which flow of liquid out of the space to be sealed is opposed by an air current conducted through the area between the sealing surface and the shaft, and in which wear of the sealing edge is reduced.

Briefly stated, these and other objects of the present invention are achieved by providing tongues which extend radially from the sealing surface.

The tongues are located on the air side of an annular sealing edge which separates the portion of the sealing surfaces which faces the liquid side from that portion which faces the air side. That portion of the tongues which is closest to the sealing edge extends from the sealing surface for a greater radial distance beyond the sealing edge diameter than do portions of the same tongue which are at a greater axial distance from the sealing edge. Consequently, there is a greater amount of overlap of tongue portions which are closest to the sealing edge.

DESCRIPTION OF THE PREFERRED EMBODIMENTS

Figure 1:
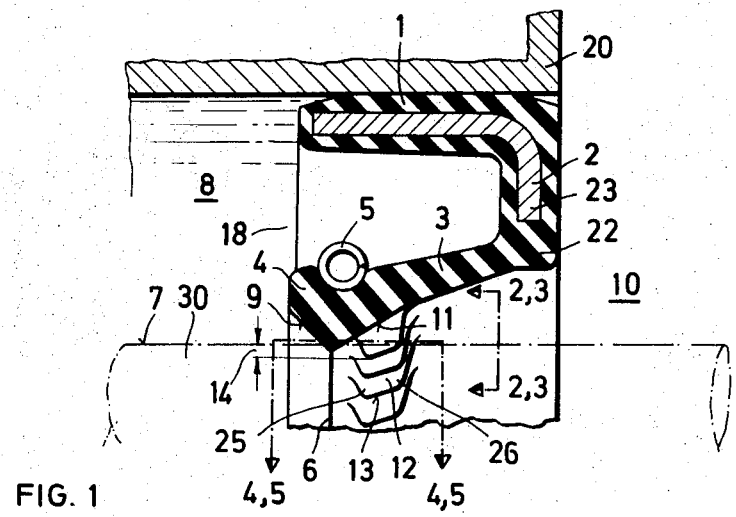
FIG. 1 is a cross-sectional view through a shaft sealing ring according to one embodiment of the invention. The ring is shown in the position which it occupies before a shaft is mounted within it. The position which a shaft will occupy is shown in dotted lines.

Referring now to FIG. 1, a shaft sealing ring 18 is mounted within shaft supporting structure 20. The ring includes an annular contact portion 1 made of rubber or other elastomeric material and has a reinforcement ring 2 embedded therein. Contact portion 1 and ring 2 each have a radially inwardly extending annular flange 22 or 23, respectively, formed integrally at one of their ends. An annular elastomer sleeve 3 is formed at the inner end of flange 22 and extends in the same direction as contact portion 1. An annular sealing portion 4 is formed integrally on the inner surface of sleeve 3. This inner surface is divided by an annular sealing edge 6 into a frontal bearing face 9 and a rear bearing face 11. When a shaft 7 is mounted within the ring, its outer surface abuts this annular sealing edge 6. Frontal face 9 slopes radially outwards and axially away from the sealing edge 6 toward a liquid space 8. As a result of this inclination, frontal face 9 will, when a shaft is mounted in the ring, face both the shaft surface and a chamber 8 formed between the shaft and the shaft supporting structure. Liquid, such as a lubricant, is placed within chamber 8. Rear bearing surface 11 also slopes radially outward and axially away from sealing edge 6 towards flange 22 and toward an air space 10. As a result of this inclination, surface 11 will, when a shaft is mounted within the ring, face both the shaft and the air space 10 outside of the shaft.

Figure 6:
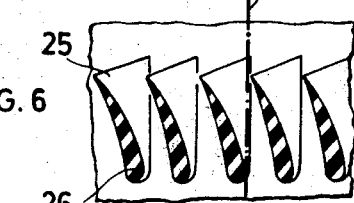
FIG. 6 is a diagrammatic sectional view taken on the line 6—6 of FIG. 2.

Tongues 12 are formed of elastic material and are integral with the sealing portion 4. They extend radially from surface 11. The inner edge 13 of the tongues extends into that region which will be occupied by a shaft 7. The frontal region 25 of each tongue edge 13, i.e., the region which is closest to the sealing edge 6, extends radially inward for a greater extent beyond the maximum radial dimension of the sealing edge than does the rear region 26 of the same tongue edge. Tongues 12 occupy a radial plane P when no shaft is mounted within the ring and they are undistorted. The frontal region 25 of each tongue is thinner in cross section than the rear region 26, as may be seen in FIG. 6.

When a shaft 7 is inserted within the sealing ring, the frontal regions 25 of each tongue are distorted to a greater extent than the rear regions 26, and consequently overlap the outer surface 30 of the shaft to a greater extent.

Figures 2, 3:
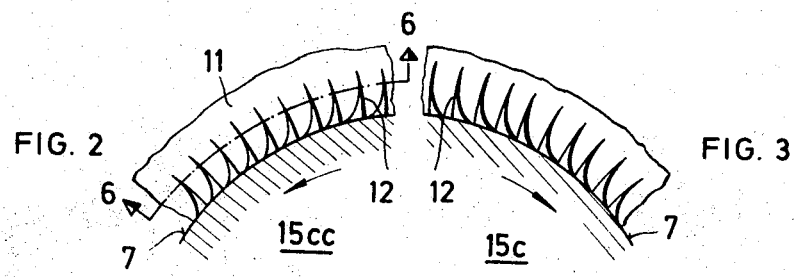
FIG. 2 is a view of a portion of the shaft sealing ring of FIG. 1, with a shaft mounted therein and rotating in the direction shown by the arrow.
FIG. 3 is a view similar to FIG. 2, but showing the position taken by the tongues when the shaft rotates in the direction opposite to that of FIG. 2.
Figures 4, 5:
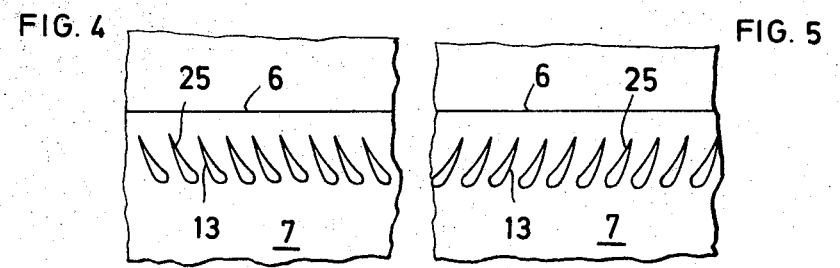
FIG. 4 is a schematic view illustrating the direction assumed by the tongues when the shaft rotates in the direction shown by the arrow.
FIG. 5 is a schematic view showing the direction assumed by the tongues when the shaft rotates in the direction opposite to that of FIG. 4.

The direction of this distortion depends upon the direction of rotation of the shaft. Referring to FIGS. 2 and 4, it will be seen that when the shaft rotates in a counter-clockwise direction as shown by arrow 15cc, frontal tongue tip portion 25 moves the greatest extent to the left as shown in FIG. 4. Referring to FIGS. 3 and 5, it will be seen that when the shaft rotates clockwise as shown by arrow 15c, the frontal portions 25 are moved to the greatest extent to the right as shown in FIG. 5.

A coil spring 5 surrounds the outer periphery of the elastic sleeve portion 3 and biases the sealing portion 4 towards the shaft 7.

During shaft rotation the sealing portion is lifted as soon as the shaft reaches a certain rotational speed. This is a result of air pressure developing initially at sealing edge 6 so that a current of air is produced from the air side to the liquid side of the seal. This current of air continuously repels the liquid to be sealed. Due to the small amount of friction acting on the sealing surface, less heat is developed and wear is reduced.

The greatest amount of overlap of the tongues upon the shaft occurs in the area which is closest to the sealing edge. This is a consequence of the fact that portions 25 are thinner and extend inward for a greater radial distance from the maximum diameter of sealing edge 6 than do the rear portions 26.

As a consequence of this arrangement, it is unnecessary to reduce the radial force exerted by the spiral tension spring 5. It is important that the greatest amount of overlap be in the region most closely adjacent to the sealing edge 6 because the oblique direction of the tongues 12 and therewith the direction of the current of air is determined thereby; equivalent to the effect caused by the rotation of propeller vanes. The rotation of the shaft 30 rotates also adjacent air, and this agitated air moves along the oblique tongues 12 toward the sealing edge 6, which additionally prevents the penetration of liquid. The oblique direction of the tongues 12 is caused by the higher friction of their advance portions 25 on the shaft surface 7 near the sealing edge 6.

DESCRIPTION OF ANOTHER EMBODIMENT

Figure 7:
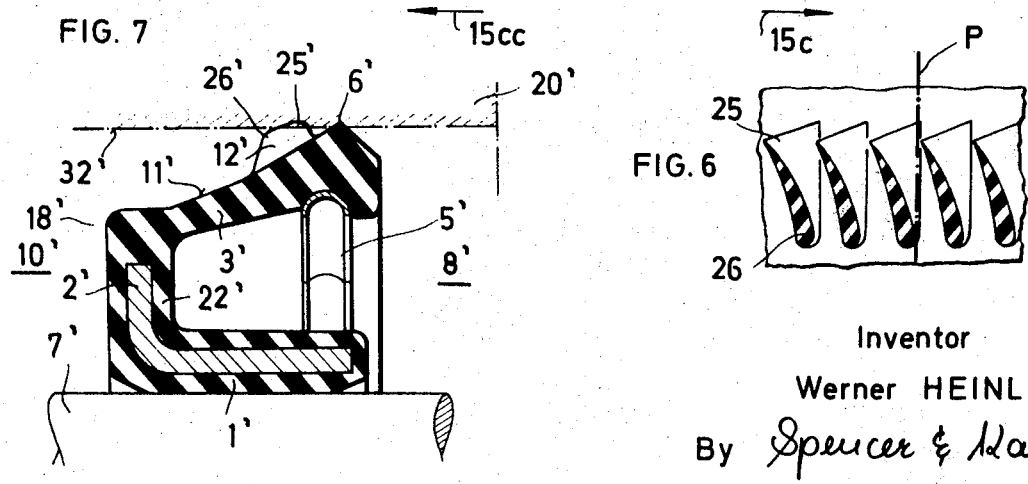
FIG. 7 is a sectional view of a shaft sealing ring according to another embodiment of the invention.

Referring to FIG. 7, there will be seen a sealing ring 18' which is fixed to the outer side of a shaft 7' and rotates with it.

Sealing ring 18' is generally similar to sealing ring 18 and corresponding parts are given corresponding reference numerals. Connecting portion 1' is secured to the shaft by any desired means and has an integral flange 22' extending outwardly therefrom. Annular sleeve 3' is spaced radially outwardly from connecting portion 1' at the end of flange 2'. Tongues 12' are integral with and extend outwardly from bearing surface 11'. Frontal tongue regions 25' which are most closely adjacent to sealing edge 6' extend outwardly for a greater radial extent than do rear regions 26'. Front portion 25' extends beyond the greatest radial diameter of sealing edge 6', and overlaps an inner cylindrical surface 32' of the shaft supporting structure 20'. A resilient ring 5' biases the sealing edge and the tongues outwardly into an engagement with this surface 32'.

In operation sealing ring 8' operates in the same fashion generally as sealing ring 18. Tongues 12' assume a helical orientation during shaft rotation. The direction of this helical orientation depends upon the direction of shaft rotation. A similar air pressure opposes flow of liquid from liquid chamber 8' into the air space 10'.

It will be understood that the above description of the present invention is susceptible to various modifications, changes and adaptations.

I claim:

1. A shaft sealing ring having an air side and comprising an annular contact portion; an annular sleeve portion joining said contact portion; an annular sealing portion joining said sleeve portion and having an annular sealing edge; and a plurality of overlapping, circumferentially distributed, elastic tongues extending radially from said sealing portion and spaced from said sealing edge toward the air side and oriented to direct air toward said sealing edge, each tongue having a portion which extends beyond the maximum radial dimension of said sealing edge in consequence of which said tongues engage with tension a shaft surface which is also engaged by said sealing edge, said tongues being axially spaced from said sealing edge and that region of each tongue portion which is closest to said sealing edge extending radially the furthest beyond said maximum radial dimension of said sealing edge.

2. A shaft sealing arrangement as defined in claim 1 wherein the tongues have an approximately trapezoidal profile in a radial plane.

3. A shaft sealing arrangement as defined in claim 1 wherein the tongues have, in a plane which is perpendicular to a ring radius, a cross section which becomes thinner as the tongue approaches the sealing edge.

4. A shaft sealing arrangement as defined in claim 1 wherein said tongues extend radially inward from said sealing portion.

5. A sealing arrangement as defined in claim 1 wherein said tongues extend radially outward from said sealing portion.

6. A shaft sealing arrangement incorporating a sealing ring as defined in claim 1, one side of the sealed edge afforded between the shaft and said sealing edge being an air chamber and the other being a liquid chamber, said tongues being arranged on the air chamber side.

References Cited

UNITED STATES PATENTS

| | | | |
|---|---|---|---|
| 2,188,857 | 1/1940 | Chievitz | 277—134X |
| 2,606,779 | 8/1952 | Jagger | 277—134 |
| 3,197,217 | 7/1965 | Mastrobattista et al. | 277—153 |

FOREIGN PATENTS

| | | | |
|---|---|---|---|
| 1,094,515 | 12/1967 | Great Britain | 277—134 |
| 307,710 | 1/1969 | Sweden | 277—134 |

OTHER REFERENCES

Positive Action Seals in Europe, by E. T. Jagger, Journal of Lubrication Technology-Transactions of the ASME, April 1968, manuscript received at ASME headquarters, Apr. 13, 1967, pp. 424 and 431.

Jagger et al.: Further Developments in Positive Action Seals-Automobile Engineer, May 1967, 7 pages.

SAMUEL B. ROTHBERG, Primary Examiner